United States Patent
Lowenthal

(10) Patent No.: US 9,443,180 B2
(45) Date of Patent: Sep. 13, 2016

(54) SECURITY LABEL USING PRINTED LEDS

(71) Applicant: Nthdegree Technologies Worldwide Inc., Tempe, AZ (US)

(72) Inventor: Mark David Lowenthal, Gilbert, AZ (US)

(73) Assignee: Nthdegree Technologies Worldwide Inc., Tempe, AZ (US)

( * ) Notice: Subject to any disclaimer, the term of this patent is extended or adjusted under 35 U.S.C. 154(b) by 0 days.

(21) Appl. No.: 14/546,846

(22) Filed: Nov. 18, 2014

(65) Prior Publication Data

US 2015/0248603 A1 Sep. 3, 2015

Related U.S. Application Data

(60) Provisional application No. 61/947,333, filed on Mar. 3, 2014.

(51) Int. Cl.
| | |
|---|---|
| *G06F 17/00* | (2006.01) |
| *G06K 19/06* | (2006.01) |
| *G06K 7/10* | (2006.01) |
| *G06K 19/08* | (2006.01) |

(52) U.S. Cl.
CPC ..... *G06K 19/06112* (2013.01); *G06K 7/10821* (2013.01); *G06K 19/06037* (2013.01); *G06K 19/086* (2013.01)

(58) Field of Classification Search
CPC .................. G06K 7/10821; G06K 19/06112; G06K 19/06037; G06K 19/086
USPC .............................. 235/375; 340/10.6, 815.45
See application file for complete search history.

(56) References Cited

U.S. PATENT DOCUMENTS

| | | |
|---|---|---|
| 6,692,031 B2 | 2/2004 | McGrew |
| 8,171,567 B1 | 5/2012 | Fraser et al. |
| 8,593,696 B2 | 11/2013 | Picard et al. |
| 2006/0269136 A1* | 11/2006 | Squires ............... G06K 7/1443 382/181 |
| 2007/0221736 A1* | 9/2007 | Bailey .................. G09F 3/0292 235/487 |

(Continued)

FOREIGN PATENT DOCUMENTS

| | | |
|---|---|---|
| WO | 0250790 A1 | 6/2002 |
| WO | 2013121401 A2 | 8/2013 |

OTHER PUBLICATIONS

EPO as ISA, PCT/US2015/057170 filed Oct. 23, 2015, "International Search Report and Written Opinion," mailed Jan. 29, 2016, 10 pages.

*Primary Examiner* — Laura Gudorf
(74) *Attorney, Agent, or Firm* — Patent Law Group LLP; Brian D. Ogonowsky

(57) ABSTRACT

In one embodiment, a security label comprises a random arrangement of printed LEDs. During fabrication of the label, the LEDs are energized, and the resulting dot pattern is converted into a unique digital first code and stored in a database. The label is then attached to an object to be later authenticated, or the LEDs are printed directly on the object, such as a passport, license, bank note, certificate, etc. For authenticating the object, the LEDs are energized and the dot pattern is converted into a code. The code is compared to the first code stored in the database. If there is a match, the object is authenticated. The label may also have a printed second code associated with the first code, and both codes must match codes stored in the database for authentication. The general shape of the printed pattern may convey the proper orientation of the pattern.

30 Claims, 8 Drawing Sheets

(56) References Cited

U.S. PATENT DOCUMENTS

| | | | | |
|---|---|---|---|---|
| 2011/0309760 | A1* | 12/2011 | Beland | H02M 1/4258 315/201 |
| 2012/0164796 | A1* | 6/2012 | Lowenthal | H01L 25/048 438/127 |
| 2012/0169230 | A1 | 7/2012 | Lowenthal et al. | |
| 2012/0320581 | A1* | 12/2012 | Rogers | H01L 24/24 362/235 |
| 2013/0087620 | A1* | 4/2013 | Sharma | G06K 19/06037 235/472.01 |
| 2014/0266749 | A1* | 9/2014 | Thomas | G09F 9/33 340/641 |

* cited by examiner

150 CELLS
ISOSCELES TRAPEZOID
SAMPLING
ARRAY

SECURITY LABEL USING PRINTED LEDS

CROSS-REFERENCE TO RELATED APPLICATIONS

This application is based on U.S. provisional application Ser. No. 61/947,333, filed Mar. 3, 2014, by Mark D. Lowenthal, assigned to the present assignee and incorporated herein by reference.

FIELD OF THE INVENTION

This invention relates to security marks for authenticating articles and, in particular, to a security mark containing a random array of tiny printed light-generating devices, such as light emitting diodes (LEDs).

BACKGROUND

Many types of security marks or devices have been used to make a variety of objects difficult to replicate or counterfeit. For example, bank notes, passports, driver licenses, and stock certificates contain a variety of security features that thwart copying, such as hard-to-replicate printed watermarks, holograms, micro-print, etc. However, all of these security features are produced using well-known techniques, usually printing, and the security features on each article in the same class of articles are identical. For example, $100 bills of the same design generation have the same watermarks. As long as a counterfeiter can obtain sufficiently advanced equipment, it is possible to reproduce most if not all of these security features. Any newly introduced security feature, such as in bank notes with the same replicated security features, can eventually be defeated.

An optimum security feature for a wide variety of applications should be inexpensive to manufacture but should be extremely difficult to copy. Also, the security feature should be simple to authenticate. The security feature should be able to be directly printed on the article to authenticate (e.g., for passports, licenses, bank notes, etc.) or printed on a label or tag that is securable to an article to authenticate (e.g., for artwork, software boxes, etc.).

SUMMARY

A printed security mark is described that contains randomly distributed light-generating elements that are different from one security mark to another. The security marks can be directly printed on the article to be authenticated or be formed as a label or tag to be attached to the article. Since no two security marks are the same, there is no incentive for a potential counterfeiter to use the extensive resources needed to copy any one security mark.

In one embodiment, microscopic inorganic LEDs are printed as an ink in a small area, such as within a 1 cm$^2$ area. Tens of LEDs, such as 20-75, are sufficient. Printing a liquid LED ink on a substrate and curing the ink results in a random distribution of a range of numbers of LEDs on the substrate. The density of LEDs in the ink determines the average number of LEDs within the printed area. The LEDs are sandwiched between two conductor layers, where at least one of the conductor layers is transparent, so that the LEDs are electrically connected in parallel and may be energized by a suitable voltage. In one embodiment, the LEDs are printed on an adhesive label smaller than a typical stamp. A metal conductor on the label may form a loop that conducts a current in an oscillating magnetic field to illuminate the LEDs so the arrangement of LEDs can be optically detected. Alternatively, probes may supply the required voltage to the conductor layers. Each security label may be printed in a fraction of a second at a very low cost in a roll-to-roll type process.

During manufacture, the LEDs in each security label are illuminated, and the detected optical pattern is converted to a digital code and stored in a secure data base accessible via the Internet or other communication system. Any additional identification of the security label or article, such as a serial number, bar code, or Quick Response Code (QR code), may be printed on the label or article using standard black ink, and such a code is associated with the LED pattern in the database. The "low security" black ink code may simply identify a group of the labels or each label uniquely. Since the LED layer and conductor layers can be transparent, any information printed under the LEDs/conductor layers will be visible.

The security label is then affixed to any article to be authenticated. Alternatively, the LEDs may be printed directly on the article to be authenticated, such as a passport.

For authenticating the article, the LEDs are illuminated, such as by an induction power device (e.g., a coil conducting an alternating current) or probes, and the pattern of light dots is detected by an optical camera and converted into a unique code corresponding to the pattern. The code may correspond to the occurrence of one or more LEDs within particular XY cells forming a fine grid. Any conventional printed code on the label, such as a one or two dimensional bar code, for example a QR code, may also be detected. The LED code, and optionally the conventional code, is then transmitted to a server connected to a secure database, such as via the Internet or a phone connection. The database then searches for a match of the imaged LED pattern to the stored pattern for that label and authenticates the article. This is communicated to the remote user via a user interface.

Since it is extremely difficult to obtain and arrange microscopic LEDs emitting a certain wavelength in a specific "random" pattern on a security label, the security achieved is very high. Unlike black ink codes, the LED pattern cannot be copied with optical coping machines.

In one embodiment, blue emitting LEDs are printed. Any other color LEDs may be printed, or multi-colored LEDs may be printed. A phosphor layer or quantum dot (QD) layer may be formed on each LED before the LEDs are printed to wavelength-convert the LED light. If such phosphor or QD layers are used, the positions of each LED may be detected by illuminating the security label with an externally generated blue or UV light as a backup detection technique to lighting the LEDs themselves.

In another embodiment, microscopic particles of a phosphor or QD material may be printed at a low concentration on a surface, such as few particles per square millimeter, using an ink, to create the random pattern. No LEDs are printed. The optical detection equipment would then illuminate the security label with blue or UV light to cause the particles to glow, and the detected pattern is used to authenticate the article.

Since every security label is unique, there is little incentive for a counterfeiter to expend the resources needed to replicate a single security label. This is especially true when combined with an authentication database that can be queried to detect duplicate or invalid labels.

BRIEF DESCRIPTION OF THE DRAWINGS

Elements that are similar or identical in the various figures are labeled with the same numeral.

DETAILED DESCRIPTION

Figure 1:
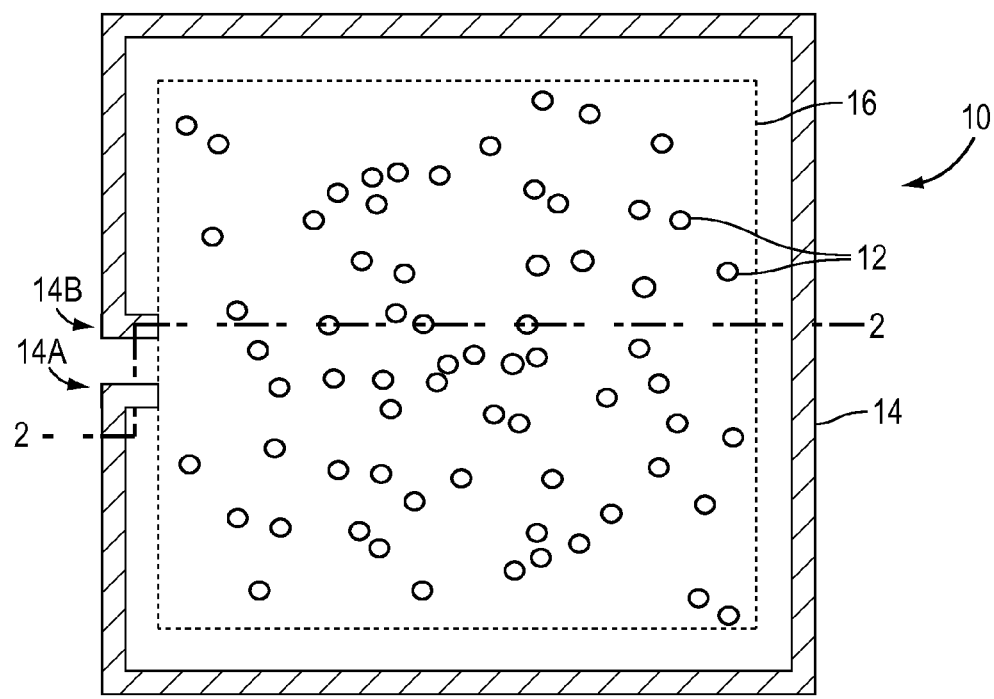
FIG. 1 is a top down view of a printed security label showing a random array of printed LEDs and an inductive loop for powering the LEDs.

FIG. 1 is a top down view of a printed security label 10 showing a random array of printed LEDs 12 and a metal inductor loop 14 for powering the LEDs 12. The perimeter of the printed LED layer (i.e., where the LED ink is printed) is shown by the dashed line 16. The label 10 may actually represent the printed material on any substrate, including the article itself to be authenticated, such as a passport, license, etc. The label 10 may be smaller than a postage stamp (e.g., less than 1 square inch) and have an adhesive backing. The label 10 may be made as a sheet or roll in a high speed roll-to-roll process and singulated. The cost per label 10 may be on the order of a penny. The label 10 is very flexible.

Depending on the drive technique used and the amount of power that must be delivered to adequately light all the LEDs 12 in the lamp, the inductor loop 14 may be printed as a flat spiral coil of two or more turns to form a secondary coil in order to efficiently couple with a primary drive coil producing an oscillating magnetic field. For two or more turns, the innermost loop connects to a first lamp electrode (e.g., an anode) and an additional insulating layer must be printed over the coil loops so that an electrical trace connecting the end of the outermost winding of the spiral coil may cross over the inner loops of the spiral coil and make electrical contact with a second lamp electrode (e.g., a cathode) to complete the lamp-coil circuit.

Figure 2:
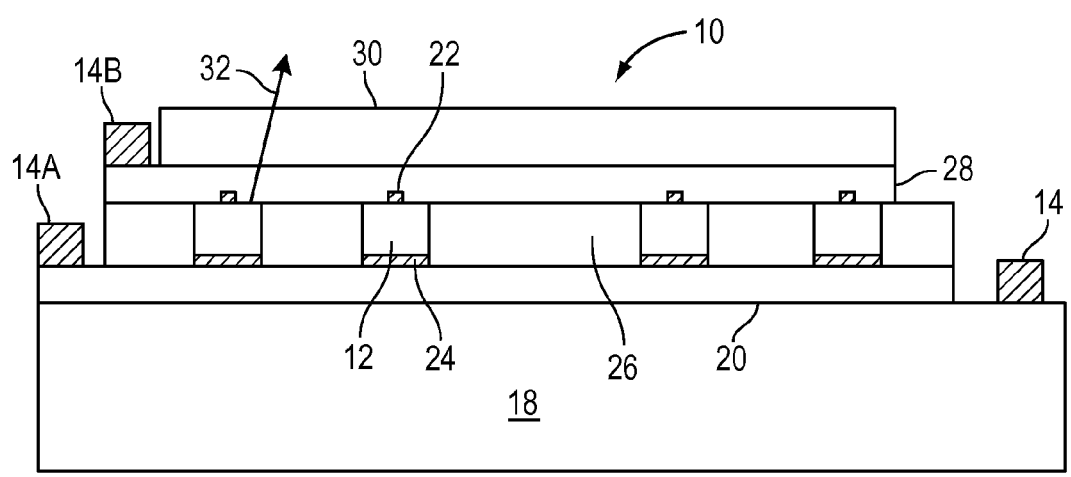
FIG. 2 is a cross-section of the security label of FIG. 1 along line 2-2 in FIG. 1, showing only a few of the LEDs, whose relative sizes have been greatly enlarged.

FIG. 2 is a simplified cross-section of the security label 10 of FIG. 1 along line 2-2 in FIG. 1, showing only a few of the LEDs 12, whose relative sizes have been greatly enlarged for illustration.

The label 10 may be formed as follows.

In FIG. 2, a starting substrate 18 may be polycarbonate, PET (polyester), PMMA, Mylar or other type of polymer sheet, or even a thin metal film, paper, cloth, or other material. In one embodiment, the substrate 18 is about 12-250 microns thick and may include a release film.

A conductor layer 20 is then deposited over the substrate 18, such as by printing. The substrate 18 and conductor layer 20 may be essentially transparent. For example, the conductor layer 20 may be ITO or a sintered silver nano-wire mesh. If light is to be emitted in the direction opposite to the substrate 18, the substrate 18 or conductor layer 20 may be reflective.

A monolayer of microscopic inorganic LEDs 12 is then printed over the conductor layer 20. The LEDs 12 are vertical LEDs and include standard semiconductor GaN layers, including an n-layer, and active layer, and a p-layer. GaN LEDs typically emit blue light. The LEDs 12, however, may be any type of LED, based on other semiconductors and/or emitting red, green, yellow, or other color light, including light outside the visible spectrum, such as the ultraviolet or infrared regions.

The GaN-based micro-LEDs 12 are less than a third the diameter of a human hair and less than a tenth as high, rendering them essentially invisible to the naked eye when the LEDs 12 are spread across the substrate 18 to be illuminated. This attribute permits construction of a nearly or partially transparent light-generating layer made with micro-LEDs. In one embodiment, the LEDs 12 have a diameter less than 50 microns and a height less than 20 microns. The number of micro-LED devices per unit area may be freely adjusted when applying the micro-LEDs to the substrate 18. The LEDs 12 may be printed as an ink using screen printing or other forms of printing. Further detail of forming a light source by printing microscopic vertical LEDs, and controlling their orientation on a substrate, can be found in US application publication US 2012/0164796, entitled, Method of Manufacturing a Printable Composition of Liquid or Gel Suspension of Diodes, assigned to the present assignee and incorporated herein by reference.

In one embodiment, an LED wafer, containing many thousands of vertical LEDs, is fabricated so that the top metal electrode 22 for each LED 12 is small to allow light to exit the top surface of the LEDs 12. The bottom metal electrode 24 is reflective (a mirror) and should have a reflectivity of over 90% for visible light. Alternatively, the bottom electrode may be made to be partially or fully transparent to allow light to be emitted in comparable amounts both upwards away from the substrate and downwards through the substrate 18. With either the solid bottom reflector electrode or the transparent bottom electrode option, there is also some side light, depending on the thickness of the LED. In the example, the anode electrode is on top and the cathode electrode is on the bottom.

The LEDs 12 are completely formed on the wafer, including the anode and cathode metallizations, by using one or more carrier wafers during the processing and removing the growth substrate to gain access to both LED surfaces for metallization. The LED wafer is bonded to the carrier wafer using a dissolvable bonding adhesive. After the LEDs 12 are formed on the wafer, trenches are photolithographically defined and etched in the front surface of the wafer around each LED, to a depth equal to the bottom electrode, so that each LED 12 has a diameter of less than 50 microns and a thickness of about 4-20 microns, making them essentially invisible to the naked eye. A preferred shape of each LED is hexagonal. The trench etch exposes the underlying wafer bonding adhesive. The bonding adhesive is then dissolved in a solution to release the LEDs from the carrier wafer. Singulation may instead be performed by thinning the back surface of the wafer until the LEDs are singulated. The LEDs 12 of FIG. 2 result, depending on the anode and cathode metallization designs. The microscopic LEDs 12 are then uniformly infused in a solvent, including a viscosity-modifying polymer resin, to form an LED ink for printing, such as screen printing or flexographic printing.

The LED ink is then printed over the conductor layer 20. The orientation of the LEDs 12 can be controlled by providing a relatively tall top electrode 22 (e.g., the anode electrode), so that the top electrode 22 orients upward by taking the fluid path of least resistance through the solvent after printing. The anode and cathode surfaces may be opposite to those shown. The pattern of the LEDs 12 is random, but the approximate number of LEDs 12 printed per label 10 can be controlled by the density of LEDs 12 in the ink. The LED ink is heated (cured) to evaporate the solvent. After curing, the LEDs 12 remain attached to the underlying conductor layer 20 with a small amount of residual resin that was dissolved in the LED ink as a viscosity modifier. The adhesive properties of the resin and the decrease in volume of resin underneath the LEDs 12 during curing press the bottom cathode electrode 24 against the underlying conductor layer 20, creating a good electrical connection. Over 90% like orientation has been achieved, although satisfactory performance may be achieved with only 50% of the LEDs being in the desired orientation for a DC driven lamp design. 50% up and 50% down is optimal for lamps that are powered with AC, such as those driven through inductive coupling using the conductive loop powered lamp as seen in FIG. 1.

A transparent polymer dielectric layer 26 is then selectively printed over the conductor layer 20 to encapsulate the sides of the LEDs 12 and further secure them in position. The ink used to form the dielectric layer 26 pulls back from the upper surface of the LEDs 12, or de-wets from the top of the LEDs 12, during curing to expose the top electrodes 22. If any dielectric remains over the LEDs 12, a blanket etch step may be performed to expose the top electrodes 22.

To produce a transparent lamp or a lamp that emits upward and away from the substrate 18, conductor layer 28 may be a transparent conductor such as silver nano-wires, which is printed to contact the top electrodes 22. The conductor layer 28 is cured by lamps to create good electrical contact to the electrodes 22.

The LEDs 12 in the monolayer, within a defined area, are connected in parallel by the conductor layers 20/28 since the LEDs 12 have the same orientation. Since the LEDs 12 are connected in parallel, the driving voltage will be approximately equal to the voltage drop of a single LED 12.

A flexible, transparent, polymer protective layer 30 may be printed over the transparent conductor layer 28. Any metal pattern may then be printed for coupling an external power source to the conductor layers 20/28.

When the LEDs 12 are energized by a voltage potential across the conductor layers 20/28, very small and bright blue dots are visible. A blue light ray 32 is shown.

For ease in energizing the LEDs 12, current through the metal inductor loop 14 is generated by inductive coupling. The inductor loop 14 may be formed by printing a metal pattern contacting the conductor layers 20/28. FIG. 2 shows a cross-section of the inductor loop end portion 14A contacting a small extension of the conductor layer 20, and another cross-section (taken at a different location) of the inductor loop end portion 14B contacting a small extension of the conductor layer 28. A majority of the inductor loop 14 is formed on the dielectric substrate 18, and a somewhat vertical conductive trace connects the inductor loop 14 to the upper end portion 14B. Each step in the vertical stair-step like rise between the portions 14A and 14B is typically less than 10 μm and so is easily traversed by a printed trace of either an opaque reflective conductive ink or a partially or substantially transparent conductive ink. A sufficient current induced in the inductor loop 14 in the proper direction will forward bias the LEDs 12 to illuminate them. A suitable value resistor may also be printed between the inductor loop 14 and the conductor layers 20/28 to limit current.

The bottom of the substrate 18 may be coated with an adhesive for affixing to an article to be authenticated.

Figure 3:
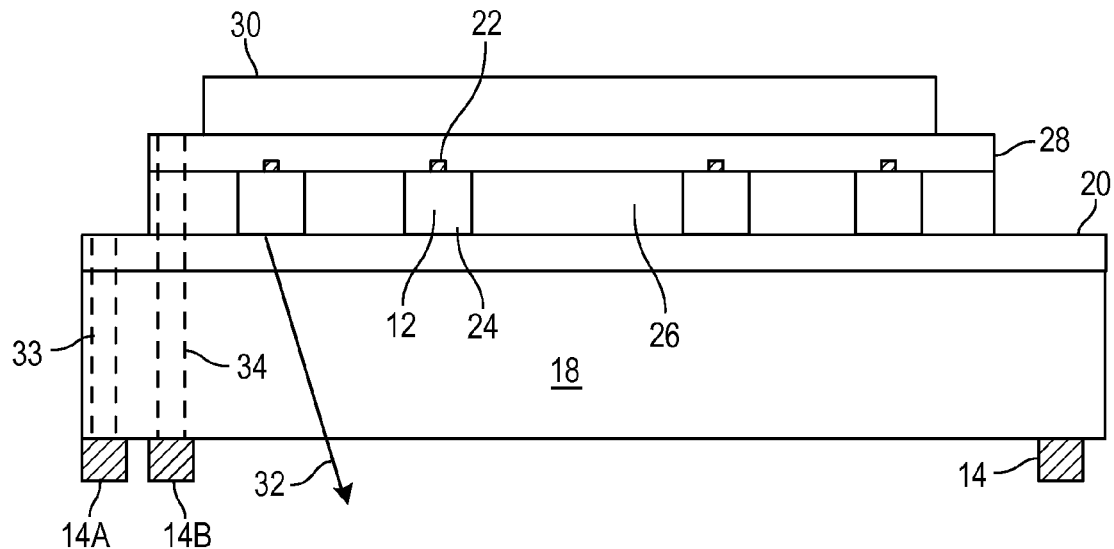
FIG. 3 is an alternative cross-section of the security label of FIG. 1 but with the LEDs emitting light through the transparent substrate.

FIG. 3 is an alternative cross-sectional view of the security label where the LEDs 12 emit light toward the transparent substrate 18 through a transparent conductor layer 20. A blue light ray 32 is shown. The transparent conductor layer 20 may be any of a variety of printable transparent conductors or conductive ITO sputtered on the substrate 18. The protective layer 30 may optionally be a reflector, and the top conductor layer 28 may be transparent or a reflector. The layer 30 and the surrounding exposed portions of the lamp (including portions of layers 28, 20, 26, and possibly portions 14A, 14B and loop 14) out onto the substrate 18 around the edges of the lamp may be coated with an adhesive, and the label 10 will then be affixed to a surface with the substrate 18 facing the viewer. The inductor loop 14 (including the end portions 14A and 14B) may be formed on the top surface of the substrate 18 as previously shown in FIG. 2 or on the bottom of the substrate 18.

If the inductor loop 14 is formed on the lamp side of the substrate 18, they may contact the conductor layers 20/28 directly. If the inductor loop 14 is formed on the bottom surface of the substrate 18 they may contact the conductor layers 20/28 using conductive vias 33 and 34 formed through the substrate 18 to connect the inductor loop end portions 14A and 14B to the conductor layers 20/28. Similarly, in FIG. 2, the inductor loop 14 may be formed on the bottom surface of the substrate 18, and vias may be used to contact the conductor layers 20/28.

The lamp structure of FIG. 3, emitting through the substrate 18, has the advantage that, if the label is affixed to a surface with an adhesive applied on top of the protective layer 30, an appropriate adhesive may be selected that will tear the lamp apart if an attempt is made to remove the label from the surface it has been affixed to.

The label 10 is very flexible and has a thickness on the order of paper or cloth, such as between 5-13 mils.

The labels 10 may be formed using a roll-to-roll process where the LEDs 12 and other layers are continuously printed on a single substrate 18 and then singulated. One surface of the labels may have a tacky adhesive applied to them, and the labels may then be applied to a wax film for creating inexpensive rolls of many labels 10. Since the positions of LEDs 12 for each label 10 are random when printed, the pattern of LEDs in each label 10 will be different and unique.

In addition to printing the LEDs 12, a black ink code, such as a machine readable serial number, bar code, or QR code may optionally also be printed on a non-light emitting portion surface of the label 10 to provide a secondary degree of security. The substrate 18, LED layer, and conductor layers are substantially transparent so the black ink code may even be printed below the LED layer. This black ink code may identify the batch of labels 10 or may uniquely identify the label 10. The black ink code may even be printed directly on the article to be authenticated rather on the label 10. The latter option allows the user of the label to define the association of a given black in code on the article being securely identified with the label 10 placed on that article. The producer of the label 10 will then be guaranteed to have no knowledge of valid pairings of black ink security codes and secure LED labels 10 in order to produce an enhanced level of security. Instead of using black ink, any other color ink may be used. The ink may even be magnetic, or an invisible fluorescent ink, or a color changing ink.

During the roll-to-roll manufacturing of the labels 10, the LEDs 12 in each label 10 are energized by an inductive coil, and an optical imager (a camera), synchronized with the energization, takes a picture of the dot pattern (e.g., blue dots) and generates a digital code based on the dot pattern. For example, the processing system in the detector may divide the picture into a grid of small cells (e.g., 10×10 cells) and generate a code that reflects which cells contain one or more dots. The dot code may also be associated with the machine-readable black ink code on the label 10. The dot code and black ink code for each label 10 are then stored in a secure database that is accessible via the Internet or other communication system.

The labels 10 are then applied by the user to the articles to be authenticated. Alternatively, the various layers may be directly printed on the articles, such as bank notes, certificates, passports, prescription drug labels, licenses, credit cards, debit cards, etc.

When someone desires to later authenticate the article, the following devices and methods may be used.

Figure 4:
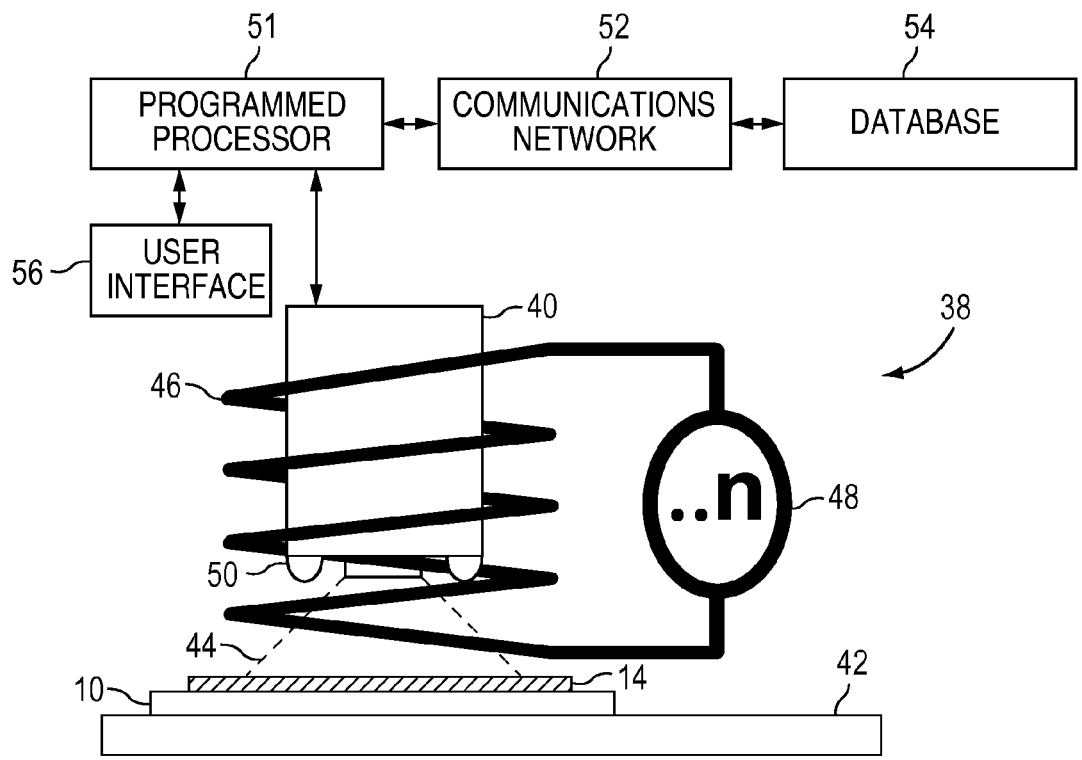
FIG. 4 illustrates a detector for inductively powering the LEDs in the security label of FIG. 1, optically detecting the light pattern, and communicating with a remote secure database for authenticating the label. The detector may additionally include a UV source for energizing phosphor or quantum dots.

FIG. 4 illustrates one embodiment of a detector 38 that powers the LEDs 12 and authenticates the label 10.

The label 10, or article having the printed layers, is positioned in front of a digital imager 40, such as a camera. The imager 40 may be hand held. The same type of detector 38 may also be used during manufacturing of the label 10 to store the unique code conveyed by the dot pattern. FIG. 4 shows the label 10 supported on a surface 42, which may be the article to be authenticated. The field of view of the imager 40 is shown by the dashed lines 44.

A metal coil 46 (the primary coil) centered over the label 10 is then energized by one or more pulses from a power supply 48 to create an electromagnetic field. An AC signal may also be applied to the coil 46. The electromagnetic field induces a current through the inductor loop 14 on the label and forward biases the LEDs 12 to continuously or briefly illuminate them.

Power may be transferred using either an RF field produced by continuous AC power to the coil 46 or pulsed, using a flyback drive approach. Driving the coil 46 with continuous AC, with a frequency from 10 kHz to 100's of kHz, will light LEDs of both orientations, with one population of LEDs lit during each half of the AC cycle, and a blue dot pattern will coincide with the locations of every printed LED 12. Alternatively, low duty-cycle square wave pulses, with a frequency from 10 KHz to 100's of kHz, may be used to induce a current in the inductor loop 14 with a voltage high enough to light LEDs of one orientation each time the current is supplied to the coil 46. If the inductor loop 14 is printed such that it has a high enough series resistance, the induced voltage signal then damps out to below the micro-LED turn-on voltage of the LEDs as the voltage in the coil 46 and loop 14 swings to the reverse polarity. This permits the LED driver to selectively light only the "down" or the "up" LEDs so that the digital imager 40 may take an exposure of the lit label 10 that spans multiple driver cycles. The polarity of the pulses in the coil 46 is used to select whether the "up" or "down" LEDs 12 are to be lit. The combined pattern of up and down LEDs may be part of the unique code.

Further details of a technique to energize LEDs using an inductor coil and a driver may be found in U.S. Pat. No. 8,413,359, assigned to the present assignee and incorporated herein by reference.

The LED wafer, prior to singulation to form the microscopic LEDs 12 for printing, may be coated with a phosphor layer or quantum dot (QD) layer over their emitting surfaces during fabrication. Various semiconductor lithographic techniques may be used to prevent the phosphor layer or quantum dot layer from coating the top electrode. The phosphor or QDs are energized by the blue LED light or an external blue or UV source to display a random arrangement of lit dots in the label 10. The phosphor or QD layer may emit any color light, such as blue, red, green, yellow, or white. Some of the LED light may leak through the phosphor or QD layer to combine with the phosphor light. In the event that a power source is not available to energize the LEDs 12 during authentication, or if there is a circuit failure, the detector 38 includes UV light emitters 50 that illuminate the surface of the label 10. The phosphor or QD lit dots are then detected by the imager 40 to perform the authentication.

Once the random arrangement of dots is illuminated, either by the LEDs 12 or the external light source, a programmed processor/memory system 51 connected to the imager 40 records the image and generates the unique code for the dot pattern in the same manner as the code was generated during the manufacture of the label 10. Any other identifying mark on the label 10, such as a serial number, is also optically detected and associated with the dot code. A printed serial number on the article itself, such as a passport, banknote, license, or certificate, may also be optically detected by the imager 40 and ultimately cross-referenced with the dot code.

The dot code and other optically detected information are then transmitted via a communications network 52 to a secure database 54. The user uses a user interface 56 to control the authentication process and receive the authentication information. The user interface 56 may be a simple button pad with a display.

The database 54 then compares the dot code to a stored dot code and, if there is a match, the label 10 is deemed authentic, along with the associated article. The optically detected label serial number (or other printed code) may also be detected, and both codes are compared with associated codes in the database 54 for additional security. The identification that the label 10 is authentic may be transmitted to a display in the user interface 56, or other systems may be used to register that the label 10 is authentic or not authentic.

Figure 5:
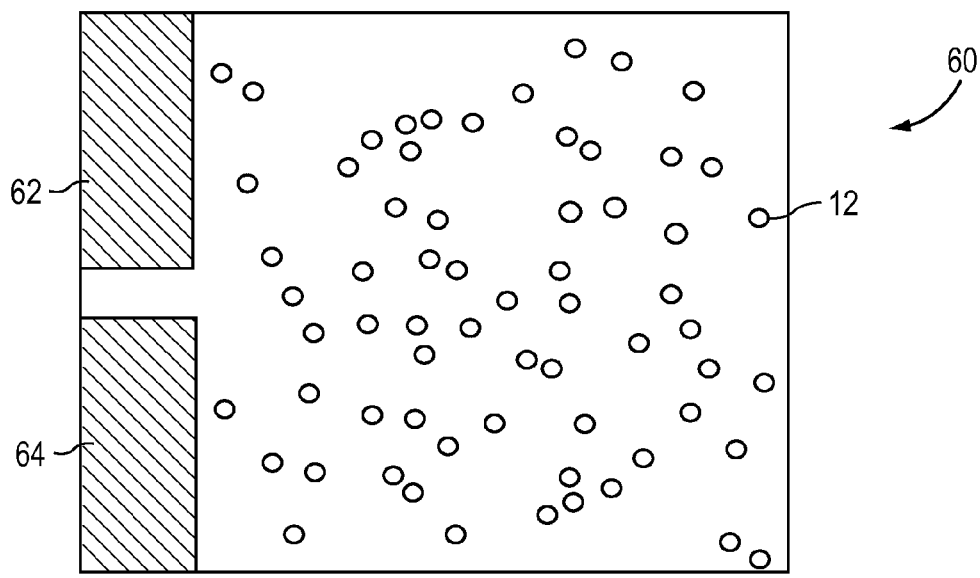
FIG. 5 is a top down view of another embodiment of the security label with contact electrodes for direct probing with a current source.

FIG. 5 illustrates another embodiment of a label 60 formed in the same way as the label 10 except there is no inductor loop. Instead, the conductor layers 20/28 are terminated with metal pads 62 and 64 for being contacted by probes in the detector. A sufficient voltage applied to the pads 62/64 will illuminate the LEDs 12.

Figure 6:
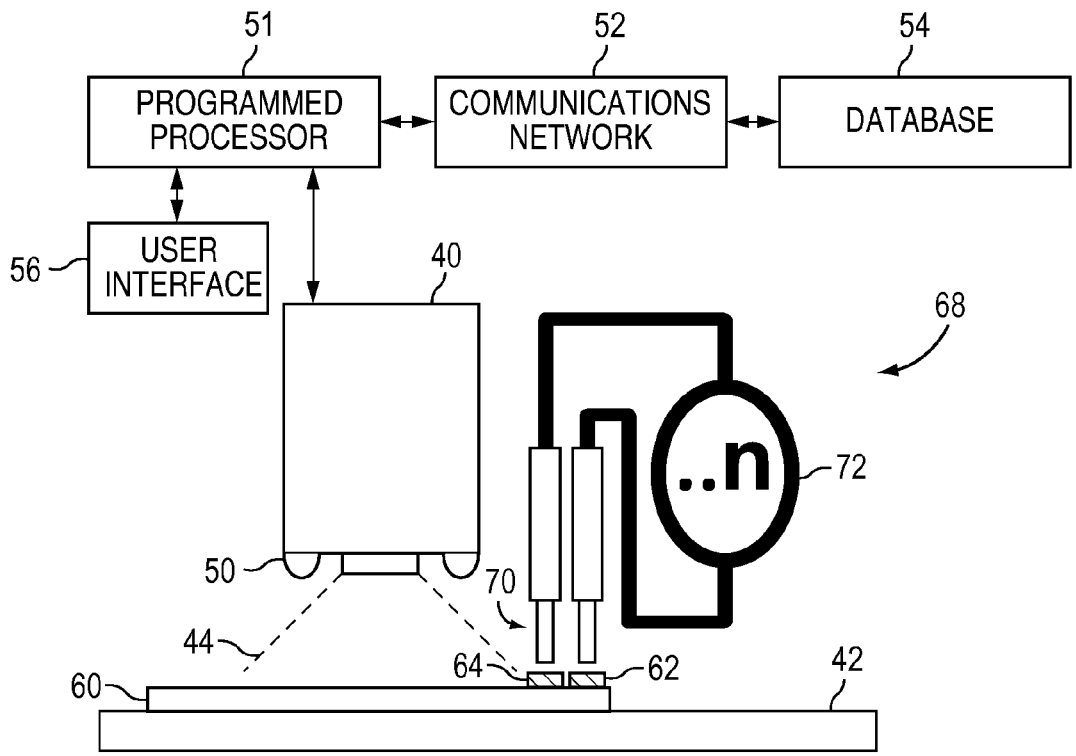
FIG. 6 illustrates a detector for applying power to the LEDs in the security label of FIG. 5, optically detecting the light pattern, and communicating with a remote secure database for authenticating the label. The detector may additionally include a UV source for energizing phosphor or quantum dots.

FIG. 6 illustrates a detector 68 for authenticating the label 60. All elements are the same as the detector 38 of FIG. 4 except for metal probes 70, for applying a voltage to the pads 62/64, and a polarity switchable DC voltage source 72, which can be used to selectively illuminate LEDs 12 in each orientation. A simple AC voltage source may be used to illuminate both orientations of LEDs 12 without orientation selectability.

The LEDs 12 and conductors/pads may be printed so that the probes can energize selected sections of the label 60. A single common (e.g., grounded) probe may be used, and the various LED sections may be illuminated by one or more positive or negative voltage probes. A metal pad for a section may be printed along an associated side of the label 60.

In another embodiment, a magnified image of the LEDs 12 may be viewed without even energizing the LEDs to detect the LED pattern. The pattern code may then be compared to the stored code for authentication.

Figure 7A:
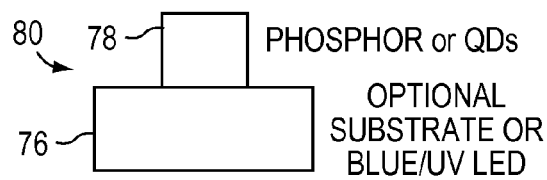
FIG. 7A is a cross-section of an LED, or other substrate, with a phosphor layer or quantum dot layer that is energized by blue or UV light.

In another embodiment, as shown in FIG. 7A, the light-generating devices do not use LEDs. FIG. 7A shows that any substrate 76, such as silicon, a ceramic, a polymer, etc., can have a phosphor or QD layer 78 deposited over it prior to singulation, and the microscopic singulated devices 80 are then printed on a flexible substrate 82 (FIG. 7B) as an ink to form a security label 84. The shapes of the devices cause the devices to self-orient during printing. An external UV or blue light source energizes the devices 80 instead of using LEDs. No voltage source or conductor layers are needed.

Alternatively, substantially uniform particles of phosphor or quantum dots are printed to form a random array of the microscopic particles on a label, and a UV or blue light source energizes the particles instead of using LEDs. The phosphor or quantum dot particles may be directly dispersed in an ink at a low concentration so that no substrate 76 (FIG. 7A) is needed. The ink solvent is evaporated, leaving the wavelength-conversion particles randomly scattered on the label surface. No voltage source or conductor layers are needed.

Figure 7B:
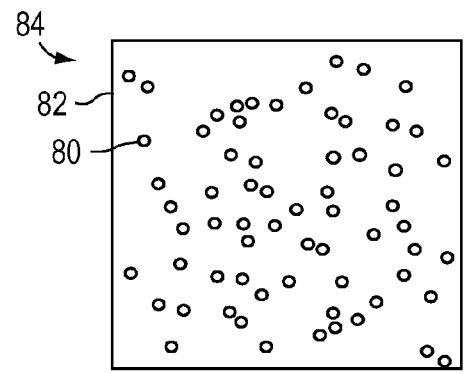
FIG. 7B is a top down view of a security label with a random pattern of the printed devices of FIG. 7A, where the printed devices are illuminated with either LED light or an external light source.

In the sample label 84 of FIG. 7B, there are no active devices, and the wavelength-conversion particles, such as the devices 80 or particles, are randomly arranged on the substrate 82. The arrangement of dots, when illuminated, serves the same function as the LEDs 12 of FIGS. 1 and 5. However, the security is lowered since there is no need to form the relatively complex LEDs 12.

Each label, using any of the above described techniques, may contain several dozen micro-LEDs 12 and may be under a square inch in area, for example, as small as 1/64 of a square inch to several square inches in area. The label is affixed to the surface of some article whose authenticity must be verified at a later time. The printed micro-LED lamp labels may be transferred to a target surface using any number of well-known techniques used by industry to transfer labels and apply them to surfaces. For example, the micro-LED lamp security labels may be printed on a continuous or semi-continuous tape to produce a series of lamps along the tape length. The tape may be backed with adhesives and cut to separate the lamps or separated along perforations between the lamps on the tape, or individual lamps on their substrate with adhesive backing may be affixed to a continuous release tape after being cut from the original micro-LED press sheet. The adhesive may be pressure sensitive, heat sensitive, light-activated, or may use some other adhesion activating technique appropriate for the surface to which the label is to be laminated. Alternatively, the substrate or the top protective coating of the lamp itself may be made completely of a low glass transition temperature polymer that can be affixed permanently to a preferably absorbent surface using a heat lamination process that merges the lamp and the target surface.

The adhesive-lamp combination may be constructed in such a manner that removing the tape will destroy the lamp, making it impossible to recreate the original dot pattern. For example, each lamp may be over-coated with a strong contact adhesive, which has greater cohesion with the target object's surface than the interlayer cohesion between at least two active layers within the lamp. Attempting to remove the label from the object to which it has been affixed will split the lamp between active layers, permanently destroying all or some portion of the lamp's lightability.

The labels may also be used to secure containers, where the label is affixed as a seal and must be broken or removed to open the container. A broken label will not light and cannot be repaired. Such a seal may be used for software cases, CD cases, DVD cases, etc. Each unique micro-LED security label lamp in itself is difficult to produce, greater than the difficulty of reproducing a hologram label.

Instead of a label with an adhesive, the lamp may be a non-adhesive tag that is secured to the object to be authenticated.

To add an additional layer of security, a hidden "watermark" may be integrated into the micro-LED lamp. Watermarks can be easily created by including a "no-go" area within the printed lamp, where the randomly scattered micro-LEDs 12 will never be printed. A different hidden watermark or set of watermarks may be used for each object class to be securely identified. If the shape of the watermark is designed properly, composed of narrow sinuous lines and/or dots or squares, it will not be visibly detectable against the random background of lit micro-LEDs. Any micro-LED label that is lit, imaged, and compared to the secret no-go map for that label type will immediately be detected as a forgery if a micro-LED appears in a no-go watermark area.

Figure 8A:
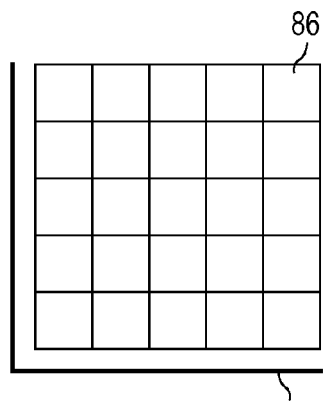
FIG. 8A illustrates a simple 5×5 grid identifying all the possible XY cells that may contain an LED, where the optically detected occurrence or non-occurrence of an LED in each cell is used to generate a code corresponding to the pattern of LEDs with respect to the grid. The grid lines are not actually printed but are virtual and applied during processing of the LED image.
Figure 8B:
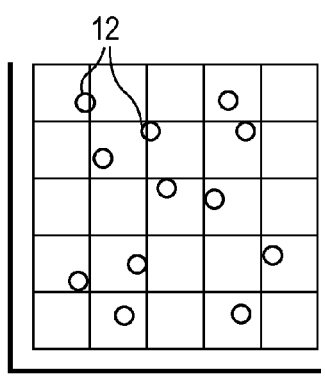
FIG. 8B illustrates an array of printed LEDs, where the LEDs have been blocked from being printed in a certain pattern of 5 cells in the grid for creating an additional level of security, referred to as a watermark.
Figure 8C:
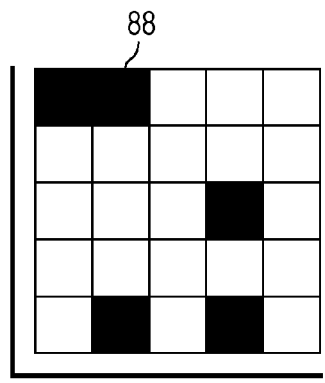
FIGS. 8C-8G illustrate various mask patterns that prevent LEDs, or the devices of FIG. 7A, from being printed in the darkened cells for creating a watermark. When the watermark pattern of dark squares in 8C through 8G are added together, they completely cover the lamp surface without overlap.
Figure 8D:
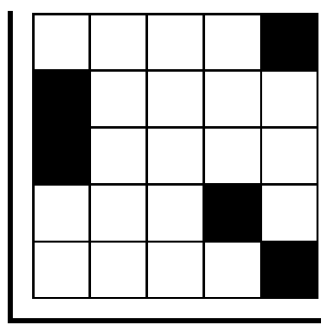
Figure 8E:
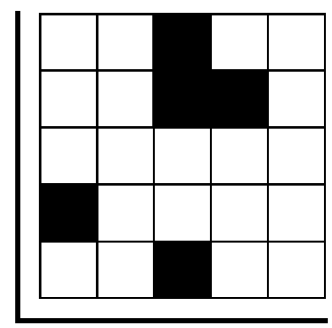
Figure 8F:
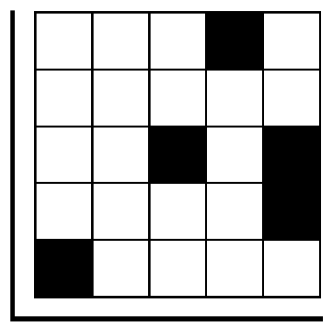
Figure 8G:
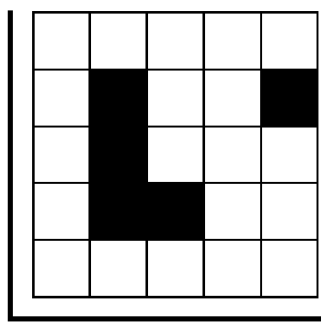

FIGS. 8A-8G are used to describe possible simple watermarks. FIG. 8A illustrates a 5×5 grid of cells 86, where any combination of the cells may be blocked using a printed hydro-phobic mask or the LED ink is prevented from being printed in the selected cells by a screen printing mask. The grid lines are not printed and represent cell locations programmed into a processor. An optically detectable "proper-orientation mark" 87 is printed on the label. FIG. 8B illustrates a printed label containing LEDs 12, where the LEDs 12 are prevented from being printed in certain no-go cells. FIGS. 8C-8G illustrate a few of the possible combinations of no-go areas 88 in black, where five of the cells are no-go cells. The locations of the LEDs 12 in FIG. 8B coincide with the watermark of FIG. 8D. With a higher concentration of printed LEDs 12, at least one LED would be printed in the allowable cells.

In actuality, the grid size will be larger than 5×5, and there will be many more combinations of no-go cells. The pattern of LEDs 12 may not be in a grid pattern at all, but instead be arranged as a complete tiling of the lamp surface with non-overlapping irregular shapes.

Even with only 10% to 20% of the secure lamp surface dedicated to the watermark, a virtually infinite number of distinct watermarks are possible. This opens the possibility of using more than one watermark design, say four or five, for a given class of objects to be validated. If several different watermarks are used, determining any one watermark is difficult. However, it may still be possible to create a composite of all the known watermarks by examining a large number of labels and then creating forgeries based on this synthesized watermark. To avoid this, the watermarks used to identify a particular class of objects may be selected to use mutually exclusive areas of the lamp such that the set of watermarks when combined together perfectly and without overlap tile the surface of the lamp, making it impossible to make any one of the watermarks in the set of watermarks visible by summing together a sampling of many lamps. The watermarks shown in FIG. 8C through FIG. 8G form such a set of watermarks, in which the entire lamp surface is tiled without overlap when all five of the watermark patterns are overlain on top of one another.

The 5×5 grid example has a fairly small number of watermark and ID possibilities and is only used as an example. In an actual implementation using a sampling grid, the sampling grid would be greater than 10×10, or preferably even larger, say 10×15. For a 10×15 grid (150 cells) containing 5 watermarks, with each watermark including 30 cells, there are a total of $3.220 \times 10^{31}$ possible watermark combinations.

The number of possible watermarks in such a lamp permits watermarks sets to be designed and assigned freely, with no concern that duplicate watermark sets will accidentally be assigned to two different classes of objects needing different ID tags. To increase the computational complexity of trying to break the watermark security further yet, the number of cells in each watermark in the watermark set may differ somewhat, but the watermarks will still sum to tile the entire lamp sampling grid.

The entire set of valid watermarks that authenticate a given article are stored in a secure database. There is no reason to test any LEDs after printing for storage of the illuminated dot pattern in the database, since it is assumed the LED patterns coincide with stored watermarks. Any counterfeit label has an extremely small chance of matching a stored watermark. For authentication of any label containing a watermark, the LEDs are energized by the detector of FIG. 4 or 6, and the resulting "dark cell" pattern is compared to the set of stored watermarks to determine if there is a match. If so, the user is informed that the label is authentic. Both the watermark and the dot code authentication techniques may be used in combination if a two level authentication system is desired, one level using the watermark that permits anonymous validation without tracking, and the other using the dot code that can be used to identify a specific label previously recorded in a database.

As an example of the use of a watermark to authenticate an article, let's assume the company Gucci America, Inc. wants to implement a means of authenticating that 1000 Gucci handbags of a certain style are authentic. A tag, implementing the present invention, can be secured to each of the handbags at the manufacturing facility. When the tag is optically detected at a point of sale, it is authenticated by the inventive system, proving that the handbag is authentic. In one example to make the tag, the tag has printed on it microscopic LEDs over a virtual grid of cells, where the LEDs are blocked from being printed in certain predetermined cells so as to form a watermark. There may be many millions of watermark possibilities, but only five different watermarks will be assigned to the 1000 handbags, such as the five watermarks of FIGS. 8C-8G, although the grid size will be much larger (e.g., 100×100 cells) than the 5×5 grid size of FIGS. 8C-8G. Since there are 1000 handbags and five different tags, groups of 200 handbags will have the same tag. Multiple watermarks are assigned to the 1000 handbags so that a forger cannot reverse engineer a single watermark by superimposing the LED patterns of a large number of tags. Ideally, the superimposed combination of the five watermarks in the set assigned to the 1000 hangbags completely fills in all cells in the grid without any gap or overlap so there is no clue to the watermarks obtained by superimposing the LED patterns on the tags. Since the locations of the individual printed LEDs are random due to the printing process, and the LED distribution is relatively sparse, the locations of the cell boundaries are hidden from a forger. Digital codes corresponding to the five watermarks associated with the 1000 handbags are stored in a secure database. For authentication of a handbag, the attached tag is optically detected at the point of sale to create a digital code corresponding to the LED pattern. The code corresponding to the LED pattern also conveys the watermark since it indirectly conveys the pattern of cells that do not contain any LEDs. The code is transmitted to the database and processed to determine the watermark pattern (the pattern of no cells containing any LEDs). If the watermark pattern matches a stored watermark pattern for that style of handbag, the handbag is deemed authentic. The processing for determining the watermark on the tag may also be performed by the detector at the point of sale. The specific locations of the printed LEDs within the various cells are not relevant for authentication since only the watermark (absence of LEDs in cells) is used. Since the specific locations of each of the LEDs are not relevant, the optical detection of the watermark may be simplified by simply determining which cells do not contain any LEDs and codifying such information. In such a case, the detector software effectively overlays a virtual grid pattern on the detection area and examines each cell to determine whether there are any LEDs in the cell.

For another style of Gucci handbag, a different set of five different watermarks may be assigned to that style. Such watermarks will be associated with that style and stored in the database. For authentication, both the style handbag and watermark pattern are transmitted to the database for matching to a stored style/watermark. The particular style of handbag may be conveyed to the database by a separate code on the tag, such as a machine-readable bar code or style number.

In the example, there are five watermarks assigned to a particular type of article, but there may be any other number of watermarks in the set, such as 3, 4, 10, etc.

In another embodiment, instead of printing light-generating devices to form the watermark pattern, such as LEDs, phosphor particles, or quantum dots, non-light-generating particles can be used, such as black particles (e.g., carbon) suspended in a solvent as a printable ink then cured to evaporate the solvent. The locations of the black (or other color) particles (dots) on the authentication tool (e.g., label) would be random, but the particles would be masked from being printed in the predetermined exclusion cells to form the watermark. The random printing of the particles, and the dispersion of the particles, would not convey any grid cell boundaries to a potential forger of the watermark. The light source for illuminating the authentication tool can be ambient light or a suitable light source on the detector. By using small black particles, the authentication tool can use a very high resolution cell grid, hidden in an area that appears to the eye to simply be a random dot screening pattern to produce a tint on a particular area of artwork. Only a portion of the area tinted with the particles might actually contain the watermark. The rest of the area could simply be a random dot (particle) pattern to further disguise the tinted area of the artwork containing the random dot (particle) pattern used to form the watermark. The authentication tool may thus appear semi-transparent, such as an overall gray color.

In order to maintain the maximum security of the watermark being used, the manufacturing site where the labels are printed should be kept under high security to prevent unauthorized access to information about the watermark set being used for any given class of objects to be secured. The press sheets containing the lamps must be diced into lamps and their order should be randomized before allowing them to exit the secured facility. It might be possible to decrypt the entire watermark set by looking only at printed samples if the original position of each label on the press-sheet were known and a sufficiently large number of such labels could be analyzed. Once randomized, the only concern would be theft of a shipment of secure labels. Watermark sets could be changed fairly frequently so that blocks of labels of which some had been stolen could be subjected to more intense scrutiny for validity, or simply destroyed and never used if the theft is detected before the objects to which the security labels are affixed have been shipped. In fact, each shipment could use a different watermark set, since the universe of possible watermarks is very large ($10^{31}$ in the moderately large example above). If the entire shipment was delivered without any theft detected, then all the watermarked labels in the shipment could be safely used in the desired application.

To guard against the use of a watermark set stolen from the secure micro-LED label manufacturing site, the secure labels may be used in pairs. Dozens of valid watermark sets could be defined, creating a library of watermark sets, but only specific combinations of pairs of watermark sets would be considered valid. These pairings could be selected and stored securely at the label consumption entity, unknown to personnel at the secure label manufacturing site. Stealing any or all watermark sets would be of no use without knowing how to validly pair them, thus enhancing security of the lamp labels, independent of security measures at the lamp label manufacturing facility.

Additionally, the queries sent to the secure watermark database could be logged and stored for some period of time. If a flood of identical queries are detected from a variety of sites scanning the security labels, this can be used as an indication that someone has managed to exactly reproduce a single or a small number of micro-LED security labels, since each watermark should be unique in order to pass the watermark security test. Once detected, this would give an opportunity to investigate such incidents, if they occurred. Note that very close matches might also be detectable in order to prevent attacks that involve producing forgeries that simply subtract a few micro-LEDs from a known valid micro-LED security label.

Many objects that are popular with counterfeiters are possible applications for the type of secure label described above. Currency is of course an excellent example. The advantage of the above system is that it does not rely on a permanently recorded and tracked optical ID unique to each printed to bill, and so avoids civil liberties concerns that might arise from the possibility of tracking money everywhere it is used. Other possible examples are, but not limited to, software, expensive designer apparel/accessories, and prescription drugs labels.

As previously mentioned, the random locations of the printed microscopic LEDs (or other microscopic light-generating devices) within a virtual partitioning of the lamp surface, such as a grid, are used to generate a unique digital code of 1s and 0s, where the presence of one or more LEDs in a cell is a 1 bit, and the absence of any LEDs in a cell is a 0 bit. For example, in a non-watermark case, a 10×10 grid will provide a 100 position digital code, having $1.267 \times 10^{30}$ possible codes. The density of the LEDs in the ink will determine an average number of cells that contain an LED. The density of LEDs in the ink can be changed from lot to lot to maximize the range of codes. The digital code is read during fabrication when the LEDs are illuminated, and the code is stored in a database as a series of 1s and 0s. During authentication of the label, the LEDs are energized and optically detected. The dots in the image are electronically compared to a virtual XY grid to derive the corresponding digital code of 1s and 0s. This code is then transmitted to the database to determine whether the code exists in the database. If so, it is assumed the label or tag is authentic.

The micro-LED security label or tape may be used as a guaranteed unique ID tag. The locations of all the micro-LEDs in a lamp form a completely unique identifier, akin to a serial number, but more similar to the randomly generated Global Unit IDentifier (GUID) codes commonly used in many computer applications where a world-wide, all-time, guaranteed unique identifier is needed. GUID code numbers are so large, typically composed of 122 random bits, that even if billions and billions of new GUID code are generated randomly the chances of any two being alike is a very close approximation to zero.

Figure 9:
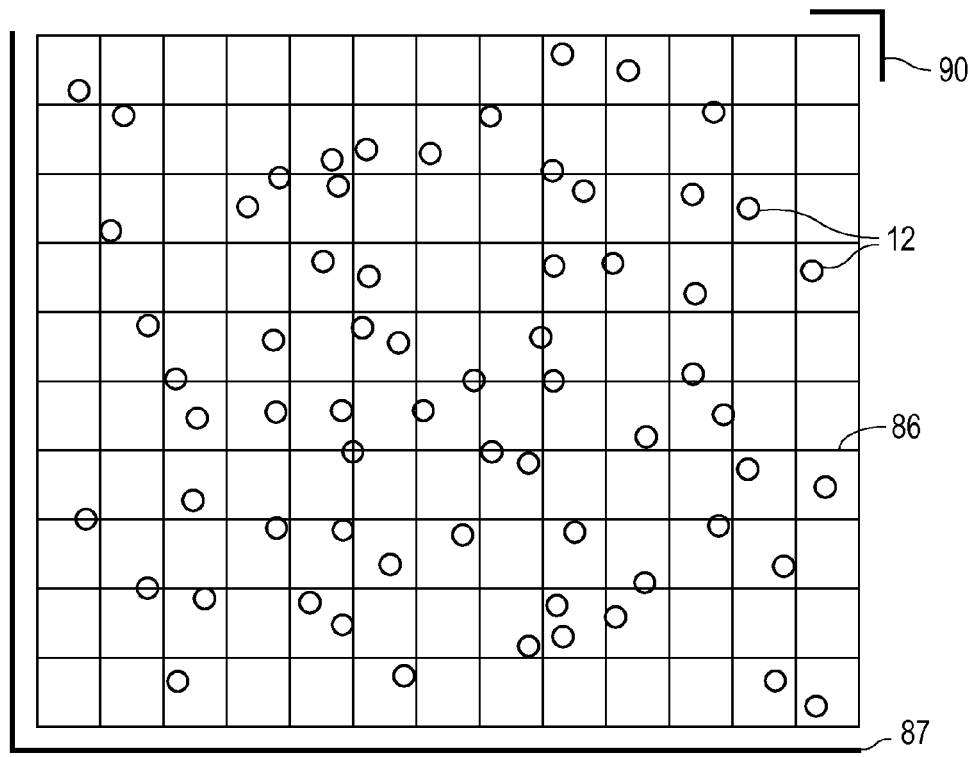
FIG. 9 illustrates a virtual 10×13 grid, less than 1 square inch, superimposed over a random pattern of 65 printed microscopic LEDs, along with printed orientation marks used when detecting the pattern of LEDs.

As an example, a cell array of 10 rows and 13 columns has 130 cells 86 and is shown in FIG. 9, giving a 130-bit number. Printed orientation marks 87 and 90 are shown. If the printed density of micro-LEDs 12 is adjusted to produce approximately 65 micro-LEDs, then approximately $2^{130}/2^{65} = \sim 2^{65}$ possible combinations are possible, or about $3.689 \times 10^{19}$. Therefore, although the codes are randomly generated and theoretically may repeat, the chances of a repetition are unlikely. This example is only an approximation, since lamps will have a distribution of total LED counts centered on 65 LEDs, with some lamps having as few as 45 and others as many as 85 micro-LEDs. This has the effect of actually increasing the number of possible unique combinations significantly. Additionally, some sampling cells 86 will contain more than one micro-LED. Using this scheme, the possible-combinations as a function of average number of LEDs divided by the number of sampling cells reaches a maximum at 0.5. Thus, the optimum number of LEDs to print on such a unique ID tag is approximately equal to half the number of grid cells sampled on the tag.

An even larger number of possible unique tags may be created by taking into account not only the micro-LED positions, but the up or down orientation of each micro-LED in the micro-LED lamp label.

Instead of LEDs, phosphor particles (or microscopic substrates coated with a phosphor layer) may be printed and energized with blue or UV light. The phosphor particles may emit yellow light or any other color. Quantum dots may also be printed.

Any version of the unique micro-LED lamp label/tag identifier described above or elsewhere in this document may be affixed to an object for which a unique identifier is desired. Each micro-LED lamp is fingerprinted either when the micro-LED lamp is initially printed or after it has been affixed to the object to be securely tagged, by imaging the micro-LED lamp while it is lit and recording the image. If UV tagged micro-LEDs are used, the UV illuminated image of the pattern of all the micro-LEDs in the printed security lamp may also be recorded. The lit-LED image, and optionally the UV illuminated image, are encoded appropriately into a compact digital format. This lamp fingerprint data is then stored in a secure database with the fingerprint data indexed for searchability. The secure database may then only be blindly queried for "Valid" or "Invalid" responses. At a later time and/or distant location, the energized lamp may be imaged and its encoded image used to query the secure lamp fingerprint database in order to verify the authenticity of the object to which the security lamp is affixed. The micro-LED secure label may be tracked by recording the location each time it is scanned.

Any system used to definitively locate LEDs on a lamp in such a way that the LED locations can be matched to a fingerprint stored in a database requires a method of establishing a fixed coordinate system by which the LED positions may be accurately and repeatably measured by an imaging device. Three problems must be addressed: measuring the micro-LED lamp coordinate X and Y axis rotation, determining the coordinate system origin position, and determining the correct coordinate system scaling along the X and Y axes.

When a lamp is being imaged, the imager needs to allow for the fact that the tag (or label) will be in an unknown orientation. It may be rotated around an axis in line with the imaging system, or worse yet, the plane of the tag may not be perpendicular to the imaging axis. If the micro-LED tag lamp has a simple rectangular or square shape, or even worse, round, it could have several or many possible orientations even when its plane is perpendicular to the viewing axis. To determine the lamp's orientation, a lamp may be accompanied by two printed solid lines of well-defined standard length next to two adjacent lamp edges and possibly intersecting at the coordinate system origin, such as the printed mark 87 in FIG. 9. For greater reliability, an additional pair of short lines, such as the orientation mark 90, may be printed at the lamp corner opposite the origin corner established by the longer lines (mark 87). These marks may be printed as solid ink lines of black or another graphically appropriate visible color. Alternatively, the lines may also be printed using invisible ink made visible only when illuminated with the proper range of wavelengths, UV light being an example. In this case, the micro-LED security lamp validation imager, examples of which can be seen in FIGS. 4 and 6, would require an integrated UV illuminator in order to properly image the coordinate system markings. Other orientation feature shapes are also possible.

The markings described above solve all three problems: the intersection of the two long lines (mark 87) establish a coordinate origin, the position of the lines themselves can be used to determine the orientation of the X and Y axis, and the length of the lines can be used to determine the scale of the coordinate system. The optional additional pair of short lines (mark 90) can be used to detect distortions in the surface and as a redundant check on the scale of the coordinate system. This system is highly robust, correctly determining the micro-LED lamp position in any possible orientation in 3D space, as long as the face of the lamp is visible to the imager.

One drawback of the orientation system based on printed lines of ink adjacent to the lamp is that imaging both the lines and the brightly lit LEDs simultaneously may be difficult because of the differing exposure levels needed to accurately image both. Two images with different exposures may be taken, but might be difficult to correlate with one another if the tag being illuminated is moving continuously during imaging. Short exposures with as short a time as possible between exposures is required to handle capturing and validating a moving security tag.

FIGS. 10-14 illustrate an alternate method of establishing a coordinate system using the shape formed by the micro-LEDs in the lamp itself to orient the lamp properly for fingerprinting and authenticity verification, thus avoiding the need for an additional printed orientation mark. The lamp may be shaped like a keystone, an isosceles triangle or trapezoid, a capital-T, or any number of asymmetric shapes that have only one possible orientation through 360 degrees of rotation.

Figure 10:
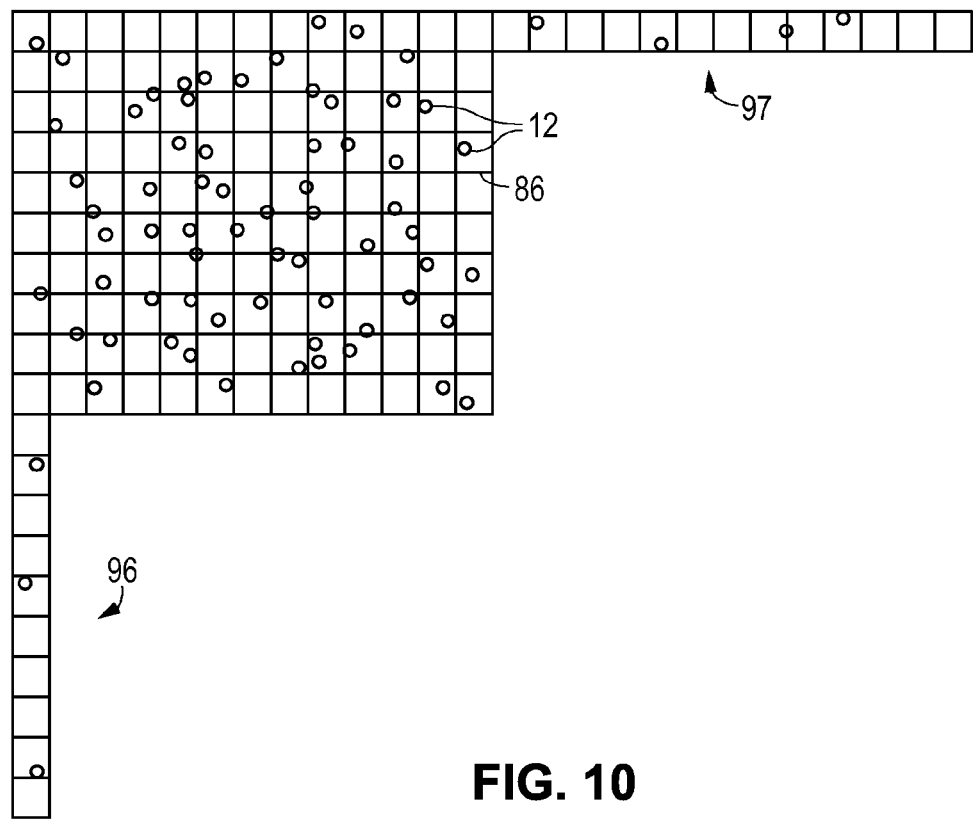
FIG. 10 illustrates a random pattern of printed LEDs and a grid, where the printed pattern of the LEDs conveys the proper orientation when detecting the pattern of LEDs.
Figure 11:
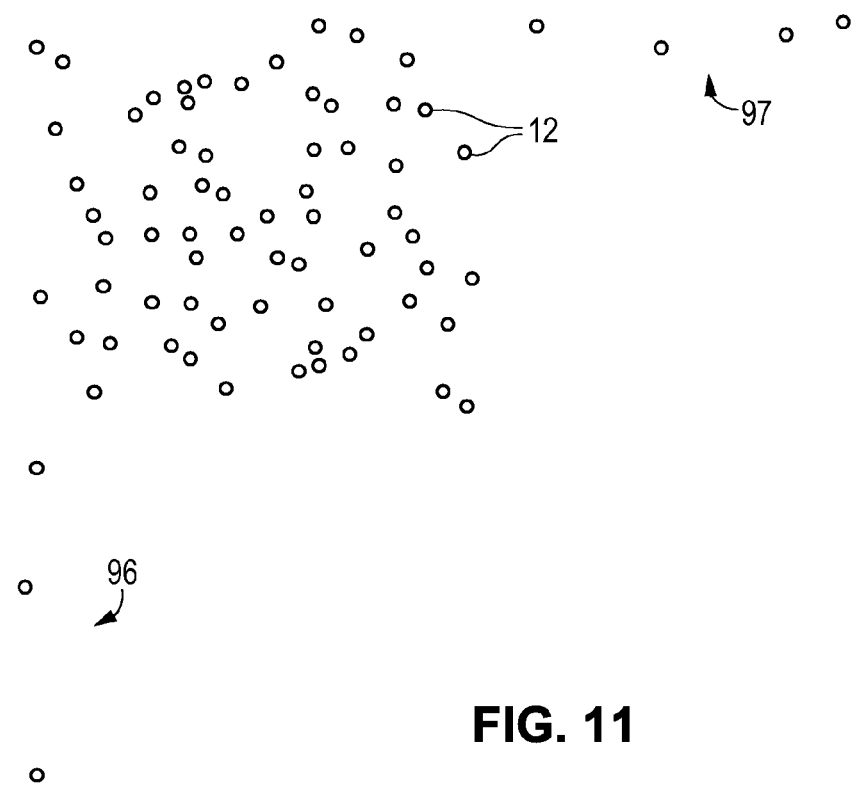
FIG. 11 illustrates the LEDs of FIG. 10 without the virtual grid.

FIG. 10 illustrates a rectangle shape with one extended row and column of LEDs 12 to create orientation guides 96 and 97. The grid lines are not printed but are programmed into a processor system to identify the cells in the array in which are located one or more LEDs 12. FIG. 11 shows the printed LEDs 12 of FIG. 10 without the grid lines. The combination of cells containing either zero or at least one LED 12 corresponds to a digital code, such as a code where each cell is a 1 or 0 bit and the combination of bits forms a unique string of bits. As previously mentioned, the unique code is stored in a database, and authenticating the tag or label involves optically sensing the locations of the illuminated dots, deriving the code, and comparing the derived code with the stored code. In the examples of FIGS. 10-14 the density of LEDs 12 in the ink randomly prints between about 65-75 LEDs over the label area.

Figure 12:
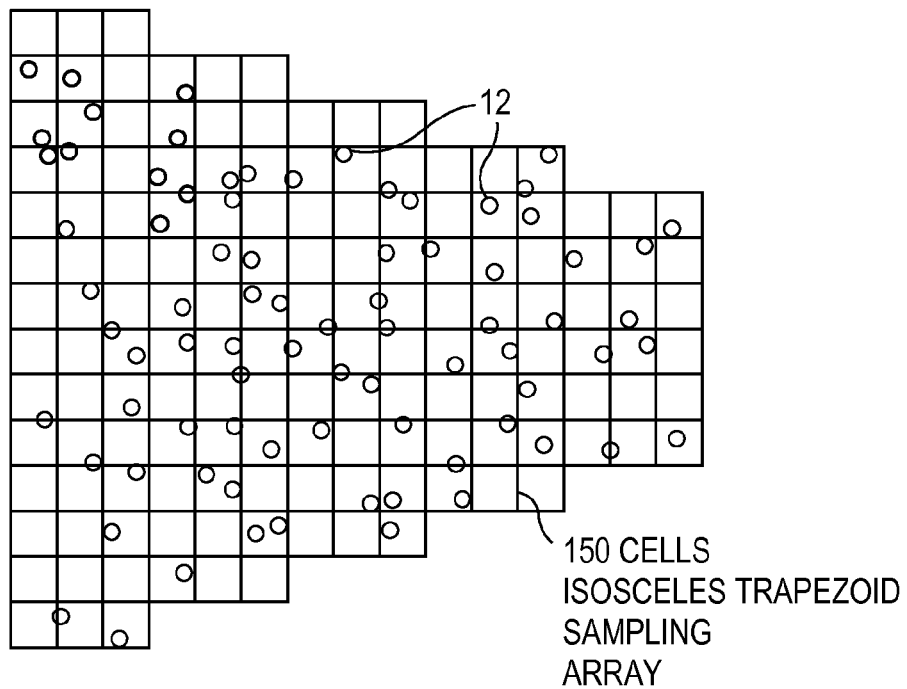
FIG. 12 illustrates another pattern of printed LEDs that identifies the proper orientation when detecting the pattern of LEDs.
Figure 13:
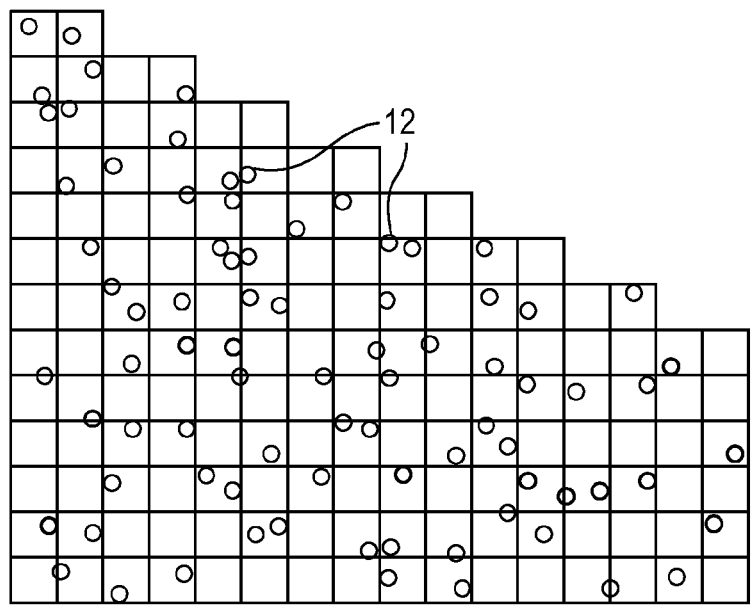
FIG. 13 illustrates another pattern of printed LEDs that identifies the proper orientation when detecting the pattern of LEDs.

FIG. 12 illustrates an isosceles triangular arrangement of LEDs 12 over a virtual grid, and FIG. 13 illustrates a right triangle arrangement of LEDs 12. No separate orientation marks are required, since the asymmetrical shape of the LED pattern identifies the correct orientation for generating the code.

Figure 14:
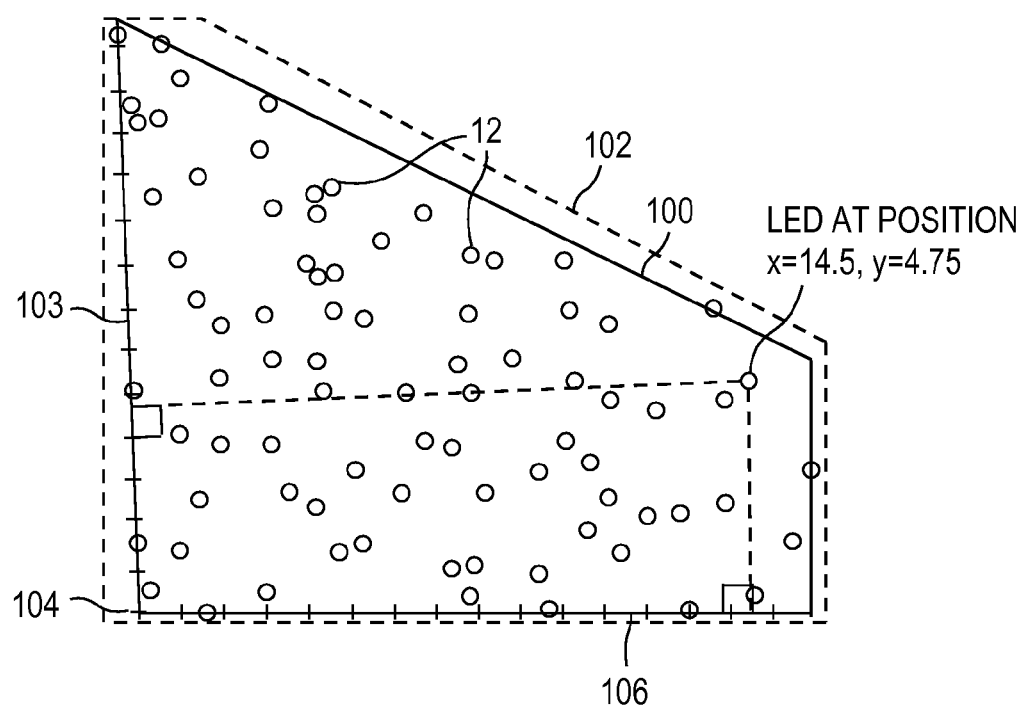
FIG. 14 illustrates how a coordinate system and an array of virtual cells are dynamically generated by a processing system when detecting and encoding the pattern of printed LEDs. The same processing is used when storing the LED pattern in the database and later detecting the LED pattern for authentication.

Although the micro-LEDs are very robust, to be insensitive to electrically or mechanically damaged LEDs that no longer light, such orientation schemes, especially the one shown in FIG. 10, would require micro-LEDs that are visible when illuminated with UV, an option previously described above where the LEDs contain a phosphor or quantum dot layer. The edges and corners of the smallest trapezoid that can completely enclose all the micro-LEDs in the lamp (when illuminated under UV) are then used to establish the coordinate system used to measure the micro-LED positions, as shown in FIG. 14. FIG. 14 illustrates the generally triangular LED pattern of FIG. 13 without the grid lines. As long as the detection is consistent between initially detecting the LEDs for storing the code and later authenticating the code, the proper codes will be compared. In FIG. 14, the edge-most LEDs are detected to create the trapezoidal outline 100 of the LED pattern. The actual area for printing the LEDs 12 is shown by the dashed outline 102. The grid array, having predetermined size cells, is then created based on the bottom edge of the trapezoid and the left edge of the trapezoid. Note that the Y axis 103 is skewed with respect to the printing area edge and not perpendicular to the X axis. The 0,0 coordinate position 104 is shown. The cell divisions 106 are shown along the X and Y axes to form an array of approximately 150 cells. Using this technique of electronically orientating the LED pattern, there is no need for the user to orient the label in any way when the LED pattern is detected during authentication. All the orienting, for both initially generating the code and for authentication, is performed automatically using programmed processors.

The technique of classifying a cell as a 1 or 0 depending if there are one or more LEDs within a cell boundary is referred to herein as a binning technique. The micro-LED cell binning technique would have to handle LEDs that are very close to binning cell partition lines between binning sampling cells. These could be sampled as a separate population from the micro-LEDs that are well within a sampling cell. Two keys could be produced from these two populations. A first low error rate key, constructed from micro-LEDs far away from binning cell partition lines, could be used as the primary key into the secure database. The remaining micro-LEDs near grid-binning lines could then be used to form a second, higher error rate key, which could be used to search the result set returned by the primary key search.

As previously mentioned, for a damaged lamp, micro-LEDs in the lamp having a phosphor layer can be imaged by illuminating the tag with UV light, rather than applying electrical power. This can also provide enough information to fully fingerprint a lamp. In fact, without using micro-LEDs, a unique optical ID tag may be created using only fluorescent particles and applying all the techniques for encoding a fingerprint for each ID, watermark, etc. as described above. However, printing micro-particles containing fluorescent materials is fairly straightforward, and can be fairly easily replicated using inkjet printing techniques. The additional complexity of both obtaining and printing functioning micro-LEDs vastly increases the difficulty of producing forgeries and the pattern of up and down orientation of the micro-LEDs in the lamp eliminates inkjet systems as a forging technique entirely.

One possible example of combining all the techniques described above together follows. Other methods of combining the UV-illuminated micro-LED location data, lit micro-LED location data, and LED up/down data are of course possible. The fingerprint extracted from the lamp may consist of a tiered set of binary keys. Given N grid binning cells, each bit of each key represents one cell. In this example, six keys are extracted from the lamp:

1) Illuminated only with UV light:
   a. N-bit key, 1s=cell contains a micro-LED far away from a binning boundary, otherwise 0. (No differentiation made between up and down orientation LEDs.)
   b. N-bit key, 1s=cell contains a micro-LED near or on a binning boundary, otherwise 0. (No differentiation made between up and down orientation LEDs.)
2) Micro-LEDs lit with power applied:
   a. Lit "up" micro-LEDs:
      i. N-bit key, 1s=cell contains "up" micro-LED far away from a binning boundary, otherwise 0.
      ii. N-bit key, 1s=cell contains "up" micro-LED near or on a binning boundary, otherwise 0.
   b. Lit "down" micro-LEDs:
      i. N-bit key, 1s=cell contains "down" micro-LED far away from a binning boundary, otherwise 0.
      ii. N-bit key, 1s=cell contains "down" micro-LED near or on a binning boundary, otherwise 0.

Note that up and down micro-LEDs may both be present in the same binning cell, and some LEDs may not be electrically lightable, but will be visible with UV illumination.

The 1a keys may be used for initial indexing into the fingerprint database, followed by an examination of the 2a-i and 2b-i key values. If a match is found, the degree of match of the 2a-ii and 2b-ii values can be used to decide whether the Unique ID tag will be considered a validated match to the secure database store. Note that these keys can be extracted from the micro-LED lamp and sent blindly as a series of only a few hundred bits to the secure server to return a "good" or "invalid" result.

Rather than binning LED positions into a sampling grid in the label reader and its integrated processor, the raw LED coordinates on the imaged lamp surface or even the image of the lit lamp may be sent to the secure server, where LED binning and subsequent database lookup and watermark detection are performed. This has the advantage of hiding the specific algorithms used by keeping them protected in the secure database facility. Examination of the software and firmware within the lamp reader in the field will provide a forger no clues as to how to proceed in producing counterfeits of the secure lamps.

Alternatively, rather than binning each micro-LED position, neural-network/database techniques might be used to fingerprint each lamp and store its fingerprint in the secure database. Other schemes based on each micro-LED position rather than binning may also be used to create a binary fingerprint of the lamp.

A variety of concepts can be applied to any of the security lamps described in this disclosure. Some examples, which are described below, may not be appropriate for the highest security designs using compound watermark and unique optical IDs described above.

The shape of the security lamp might have a distinctive shape, such as a logo, in order to render the security lamp distinctive from security lamps used by other companies. Such a lamp may still including a hidden watermark set.

The hidden watermark itself might be a logo to render the security lamp distinctive from security lamps used by other companies.

The lamp may be transparent (i.e., substrate and conductor layers are transparent) so that it may be applied over all or some portion of a photograph on an ID card or other document, such as a passport. Depositing a transparent lamp over the photograph in an ID would make it difficult or impossible to replace the photograph with a false one.

The dielectric of the lamp may be selected such that it has a controlled, recoverable breakdown behavior at fairly low voltages (less than 10V) to protect the micro-LEDs from accidental or intentional overvoltage.

A zener diode, either printed or placed using well know semiconductor industry techniques such as pick-and-place, may be connected in parallel with the lamp in order to protect the micro-LEDS from accidental or intentional overvoltage.

All features described herein may be combined in various combinations to achieve a desired function.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. An authentication system comprising:
randomly printed light-generating devices on a substrate, wherein the light-generating devices comprise light emitting diodes (LEDs), wherein the LEDs are connected in parallel such that all the LEDs on the substrate are illuminated at the same time, the randomly printed LEDs on the substrate being an authentication tool;
an energization system, external to the substrate, configured for providing power to the LEDs to cause all LEDs on the substrate to be illuminated at the same time, wherein the illuminated LEDs create a static light pattern;
an optical detector configured for detecting the static light pattern from the LEDs in the authentication tool after the LEDs have been illuminated;
a processing system coupled to the detector and configured to generate a first code corresponding to the static light pattern;
a communication system coupled to transmit the first code to a database storing pre-stored codes; and
an interface system configured to convey that the first code matched one of the pre-stored codes, signifying that the authentication tool is authentic.

2. The system of claim 1 wherein the light-generating devices are coupled to receive an energizing voltage supplied by the energizing system.

3. The system of claim 2 wherein the light-generating devices further include a wavelength-conversion material that emits a wavelength different from an energizing wavelength.

4. The system of claim 1 wherein the light-generating devices comprise a wavelength-conversion material that emits a wavelength different from an energizing wavelength, wherein the energizing system emits the energizing wavelength.

5. The system of claim 1 wherein the light-generating devices comprise microscopic light emitting diodes (LEDs) that have been printed over the substrate as an ink, wherein the ink is then cured.

6. The system of claim 5 wherein the authentication tool further comprises two conductor layers connecting the LEDs in parallel, wherein at least one of the conductor layers allows light to pass through.

7. The system of claim 1 wherein the authentication tool is an adhesive label.

8. The system of claim 1 wherein the authentication tool is a tag configured to be attached to an object to be authenticated.

9. The system of claim 1 wherein the light-generating devices are printed on an object to be authenticated.

10. The system of claim 1 wherein the substrate comprises an object to be authenticated.

11. The system of claim 1 wherein the light-generating devices comprise light emitting diodes (LEDs) coupled to an inductor loop, wherein the energizing system generates a magnetic field that induces a current in the inductor loop for energizing the LEDs.

12. The system of claim 1 wherein the light-generating devices comprise light emitting diodes (LEDs) coupled to metal pads, wherein the energizing system applies a voltage to the metal pads for energizing the LEDs.

13. The system of claim 1 wherein the authentication tool is substantially transparent so markings over which the authentication tool is affixed remain visible.

14. The system of claim 1 wherein the processing system determines the presence of one or more light-generating devices in each cell of a cell pattern applied to the authentication tool and generates the first code corresponding to locations of the light-generating devices in the cells.

15. The system of claim 1 further comprising a printed second code that is also detected by the detector and associated with the first code.

16. The system of claim 15 where the second code is printed on the authentication tool.

17. The system of claim 15 where the second code is printed on an article to be authenticated by the authentication tool.

18. The system of claim 1 wherein the light-generating devices are printed in a pattern that conveys an orientation of the authentication tool.

19. The system of claim 1 wherein the authentication tool is affixed over a surface, wherein the authentication tool cannot be removed from the surface without affecting the pattern of the illuminated LEDs.

20. An authentication system comprising:
an energizing system for illuminating randomly printed light-generating devices on a substrate, wherein the light-generating devices comprise light emitting diodes (LEDs), the randomly printed light-generating devices on the substrate being an authentication tool;
an optical detector configured for detecting a pattern of the light-generating devices in the authentication tool after the light-generating devices have been illuminated;
a processing system coupled to the detector and configured to generate a first code corresponding to the pattern of the light-generating devices;
a communication system coupled to transmit the first code to a database storing pre-stored codes; and
an interface system configured to convey that the first code matched one of the pre-stored codes, signifying that the authentication tool is authentic;
wherein the optical detector is configured to detect the pattern of the light-generating devices within a first area of the authentication tool,
wherein the randomly printed light-generating devices are excluded from a predetermined exclusion zone in the first area,
wherein the exclusion zone in the authentication tool forms a first pattern that has been previously stored in the database,
wherein the first code conveys a detected first pattern in the authentication tool,
wherein the communication system transmits the first code to the database for comparing the detected first pattern to the first pattern stored in the database, and
wherein the interface system is configured to convey that the detected first pattern matched the first pattern stored in the database to verify that the authentication tool is authentic.

21. The system of claim 20 wherein the exclusion zone, forming the first pattern, in the authentication tool is selected from a set of exclusion zones when forming the authentication tool.

22. The system of claim 21 wherein the set of exclusion zones are applied to other authentication tools, and wherein when all of the exclusion zones in the set of exclusion zones are superimposed over each other there will be no overlap of exclusion zones and no gaps between exclusions zone.

23. A method for authenticating an authentication tool, the authentication tool comprising printed light-generating devices randomly arranged on a substrate to form a pattern, the light-generating devices comprising light emitting diodes (LEDs), the method comprising:
- illuminating the randomly printed light-generating devices using a first energizing system to cause a current to flow through the LEDs;
- detecting a pattern of the light-generating devices in the authentication tool, using a first optical detector, after the light-generating devices have been illuminated;
- generating a first code corresponding to the pattern of the light-generating devices;
- comparing the first code to pre-stored codes in a database, the pre-stored codes corresponding to valid codes; and
- determining that the authentication tool is authentic if the first code matched one of the pre-stored codes;
- wherein the step of detecting comprises detecting the pattern of the light-generating devices within a first area of the authentication tool,
- wherein the randomly printed light-generating devices are excluded from a predetermined exclusion zone in the first area,
- wherein the exclusion zone in the authentication tool forms a first pattern that has been previously stored in the database,
- wherein the first code identifies a detected first pattern in the authentication tool,
- wherein the step of comparing comprises comparing the first code to the pre-stored codes in the database to determine whether the detected first pattern matches the first pattern stored in the database, and
- wherein the step of determining comprises determining that the authentication tool is authentic if the detected first pattern matched the first pattern stored in the database.

24. The method of claim 23 wherein the exclusion zone, forming the first pattern, in the authentication tool is selected from a set of possible exclusion zones when forming the authentication tool so that the first pattern is unique to the authentication tool.

25. A method for authenticating an article comprising:
- providing a pattern of detectable dots on an authentication tool, wherein the authentication tool is associated with an article to be authenticated, and wherein the dots are prevented from being located in a predetermined pattern of exclusion cells on the authentication tool;
- illuminating the dots using a first energizing system;
- detecting the pattern of exclusion cells in the authentication tool, using a first optical detector, after the dots have been illuminated;
- comparing the detected pattern of exclusion cells to a valid pattern of exclusion cells previously stored in a database; and
- determining that the authentication tool is authentic if the detected pattern of exclusion cells matched the valid pattern of cells.

26. The method of claim 25 wherein the pattern of exclusion cells on the authentication tool is selected from a set of exclusion cell patterns when forming the authentication tool.

27. The method of claim 26 wherein the patterns of exclusion cells in the set of exclusion cell patterns are applied to other authentication tools, and wherein when all of the exclusion cell patterns in the set of exclusion cell patterns are superimposed over each other there will be no overlap and no gaps.

28. The method of claim 25 wherein the dots comprise light emitting diodes (LEDs), and the first energizing system causes a current to flow through the LEDs.

29. The method of claim 25 wherein the dots comprise a wavelength-conversion material, and the first energizing system applies electromagnetic radiation to the wavelength-conversion material.

30. The method of claim 25 wherein the dots comprise printed non-light-generating particles, and the first energizing system is a light source.

* * * * *